(12) United States Patent
Perez Hinojosa et al.

(10) Patent No.: US 8,822,022 B2
(45) Date of Patent: Sep. 2, 2014

(54) THERMAL INSULATION WATERPROOFING AND ADHERIBLE FILM AND METHOD FOR PREPARING THE SAME

(71) Applicant: Aisla Coat S. de R.L. MI., Nuevo Leon (MX)

(72) Inventors: Ulises Eladio Perez Hinojosa, Nuevo Leon (MX); Juan Francisco Marquez Rodriguez, Nuevo Leon (MX)

(73) Assignee: Aisla Coat S. de R.L. MI, Nuevo Leon (MX)

( * ) Notice: Subject to any disclaimer, the term of this patent is extended or adjusted under 35 U.S.C. 154(b) by 0 days.

(21) Appl. No.: 13/674,981

(22) Filed: Nov. 13, 2012

(65) Prior Publication Data

US 2014/0023845 A1    Jan. 23, 2014

(30) Foreign Application Priority Data

Jul. 19, 2012   (MX) .................. MX/a/2012/008450

(51) Int. Cl.
 *B32B 27/00* (2006.01)
 *B32B 27/08* (2006.01)
 *C08J 5/18* (2006.01)
 *E04B 1/76* (2006.01)

(52) U.S. Cl.
 CPC . *E04B 1/76* (2013.01); *B32B 27/08* (2013.01); *C08J 5/18* (2013.01)
 USPC .......... 428/220; 428/337; 428/332; 428/338; 428/355 AK; 428/355 AC; 427/207.1

(58) Field of Classification Search
 None
 See application file for complete search history.

(56) References Cited

U.S. PATENT DOCUMENTS

| | | | | |
|---|---|---|---|---|
| 4,773,409 A | * | 9/1988 | Cilento et al. | 428/317.1 |
| 4,952,441 A | * | 8/1990 | Bose et al. | 428/121 |
| 5,154,956 A | * | 10/1992 | Fradrich | 428/40.6 |
| 8,211,961 B1 | * | 7/2012 | Perez Hinojosa | 524/556 |
| 2003/0082387 A1 | * | 5/2003 | Arndt et al. | 428/426 |

OTHER PUBLICATIONS

ULINE "Hard Surface Protection Tape". May 21, 2009. <http://web.archive.org/web/20090521100451/http://www.uline.com/BL_6424/Hard-Surface-Protection-Tape>.*

* cited by examiner

*Primary Examiner* — Aaron Austin
*Assistant Examiner* — Donald M Flores, Jr.
(74) *Attorney, Agent, or Firm* — Defillo & Associates, Inc.; Evelyn A. Defillo

(57) ABSTRACT

The present invention refers a thermal insulation waterproofing and adherible film and method for preparing the same, that for its components and physical and chemical characteristics is easy to apply, durable, and with excellent insulation and waterproofing properties. The adherible film of the present invention is manufactured by applying insulating and waterproofing material on a layer of thermoplastic polymer, preferably polyethylene. In present invention were used different thicknesses, such as 1.2, 1.5, 2.4, 2.6, 2.8, 3.0, 3.2, 3.4, 3.6, 3.8, 4.0, 4.2 and 4.4 mm, and according to tests carried out, the preferred modality that comply the requirements is 2.8 to 3.0 millimeters.

7 Claims, No Drawings

THERMAL INSULATION WATERPROOFING AND ADHERIBLE FILM AND METHOD FOR PREPARING THE SAME

FIELD OF THE INVENTION

The present invention refers to a thermal insulation waterproofing and adherible film and method for preparing the same, that for its components, physical, and chemical characteristics is easy to apply, durable, and with excellent insulation and waterproofing properties.

BACKGROUND OF THE INVENTION

The prior art shows thermal insulation waterproofing and adherible films based in materials of similar composition to the present invention, or based in equivalent polymeric components with calcium carbonate, titanium dioxide and cellulose, with the characteristics of applicability, flexibility and thickness. Although there are commercially thermal insulation and waterproofing coatings, they do not exist in the modality of sticky films with properties of the present invention. On the other hand, the advantages of the present invention will be understandable for a person with middle knowledge in the art, based on the next description in a preferred embodiment of the invention.

DETAILED DESCRIPTION

The present invention refers to a thermal insulation waterproofing and adherible film and method for preparing the same.

The adherible film comprises a base layer of a thermal insulation and waterproofing material, based in waterproofing acrylic, to coat pipes, ducts, containers, ovens and surfaces, where required to maintain the temperature and prevent moisture damage.

The preferred composition of the material used to manufacture the base layer of thermal insulating waterproofing and adherible film, in its preferred modality, descriptive but not limited to this, is as follows (table 1):

TABLE 1

Components of the thermal insulation and waterproof composition used in the present invention.

| | COMPONENT | Kg | % Weight |
|---|---|---|---|
| a) | Water | 85.700 | 50.0175 |
| b) | Sodium hexametaphosphate (Mardupol ®) | 0.150 | 0.087 |
| c) | Isothiazolone 1.5% (Kathon ®) | 0.040 | 0.0233 |
| d) | polyelectrolyte of carboxylate (Orotan ®) | 0.320 | 0.1867 |
| e) | Thickener (NDW ®) | 3.550 | 2.0719 |
| f) | Monoethylene glycol (Fortequim ®) | 0.150 | 0.0875 |
| g) | Titanium dioxide (R-902 of DuPont ®) | 2.500 | 1.4590 |
| h) | Calcium carbonate (QUALYMIN ®) | 30.000 | 17.5090 |
| i) | Styrene acrylic resin (WYN ®) | 30.000 | 17.5090 |
| j) | Dioctyl phthalate (DOP) | 2.500 | 1.45908 |
| k) | Plastifier (Texanol ®) | 0.190 | 0.1108 |
| l) | Ammonium hydroxide (Mardupol ®) | 2.500 | 1.4590 |
| m) | Acrylic thickener (WYN ®) | 1.570 | 0.9163 |
| n) | 2-ethyl-hexane (C-009 WET 40 D ®) | 10 | 5.8363 |
| o) | Hydroxy methyl cellulose (Cellosize QPS 52000 ®) | 0.67 | 0.3910 |
| p) | Thinner (Gas Nafta of Fortequim ®) | 1.500 | 0.8754 |

To prepare the thermal insulation waterproofing and adherible film, different proportions and brand name components may be used. The proportions of components can be adjusted depending on the thermal and physical characteristics desired for the adherible film in view of their application or use, such as thermal conductivity, tension, bending, compression, expansion and contraction. Preferred compositions which can be used include the following percentages by weight (table 2):

TABLE 2

Components and preferred percentages of the thermal insulation and waterproof composition used in the present invention.

| | COMPONENT | Amount |
|---|---|---|
| a) | Water | 48 to 52% |
| b) | Sodium hexametaphosphate (Mardupol ®) | 0.05 to 0.12% |
| c) | Isothiazolone 1.5% (Kathon ®) | 0.018 to 0.027% |
| d) | polyelectrolyte of carboxylate (Orotan ®) | 0.15 to 0.22% |
| e) | Thickener (NDW ®) | 1.6 to 2.4% |
| f) | Monoethylene glycol (Fortequim ®) | 0.04 to 0.12% |
| g) | Titanium dioxide (R-902 DuPont ®) | 1.05 to 1.85% |
| h) | Calcium carbonate (QUALYMIN ®) | 15.5 to 19.5% |
| i) | Styrene acrylic resin (WYN ®) | 15.5 to 19.5% |
| j) | Dioctyl phthalate (DOP) | 1.05 to 1.85% |
| k) | Plastifier (Texanol ®) | 0.07 to 0.15% |
| l) | Ammonium hydroxide (Mardupol ®) | 1.05 to 1.85% |
| m) | Acrylic thickener (WYN ®) | 0.5 to 0.13% |
| n) | 2-ethyl-hexane (C-009 WET 40 D ®) | 2.83 to 7.83% |
| o) | Hydroxy methyl cellulose (Cellosize QPS 52000 ®) | 0.01 to 0.8% |
| p) | Thinner (Gas Nafta of Fortequim ®) | 0.45 to 1.25% |

This material has a dense non-fluid consistency, which has a thermal conductivity factor (K) of 0.39 W/(m° K), an emissivity from 0.8 to 23° C., pH between 7.0 and 9.0, viscosity from 40,000 to 85,000 cps, an apparent density of 515.16 $Kg/m^3$, steam water permeability of 0.00921 ng/(Pa*s*m), a humidity adsorption of % mass of 0.065, and % volume of 0.031.

These components were selected according to chemical properties and purity, suppliers and trade names deployed in the following list (table 3):

TABLE 3

Component list according trade name, related to the thermal insulation and waterproof composition obtained by the used process in the present invention.

| TRADE NAME | MANUFACTURER | USE | SPECIFICATIONS |
|---|---|---|---|
| KATHON LX 1.5% | ROHMHAAS | BIOCIDE | Colour Gardner (vcs): 0-4, pH: 2.0-4.0, copper nitrate II: 0.15-0.17% magnesium nitrate: 0.0-3.0% |

TABLE 3-continued

Component list according trade name, related to the thermal insulation and waterproof composition obtained by the used process in the present invention.

| TRADE NAME | MANUFACTURER | USE | SPECIFICATIONS |
|---|---|---|---|
| OROTAN 731-A | ROHMHAAS | DISPERSANT | Colour APHA/HAZEN PT-CO: 0.0-250.0, specific gravity: 1.078-1.114, pH diluted: 10.2-10.6, solids: 24-26%. viscosity brookfield: 20.0-130.0 cps |
| AMMONIUM HYDROXIDE | MARDUPOL | BUFFER | Relative density 15° C.: 0.89-0.90 g/cm$^3$, Concentration: 28% minimum |
| NDW | ROHMHAAS | ANTIFOAM | Humid: 1% (max.). pH direct: 5.0-6.5, pH al 2% in water: 6.0-7.0, active ingredient: 99%, water solubility dispersible, specific weight at 20° C.: 0.83-0.85 g/ml |
| CALCIUM CARBONATE | QUALYMIN | FILLER | Dry Whitness: 91.50 (min), Retained in net-325: 1.0 (min), Oil Absorption: 20.00-23.00, Humid: 1.0% (min) |
| C-009 WET 40D | PROINSA | LIGHTEN | Average humidity content: 85%, presentation: box of 160 kg |
| SODIUM HEXAMETAPHOSPHATE | MARDUPOL | HUMECTANT | Ignition loss: 0 50% (max.), Insoluble substances: 010% (max.), Purity (as $P_2O_5$): 67.0% (min.). pH (solution 1%): 6.5-7.1, Physical aspect: odorless White powder, impurities free |
| MONOETHYLENE GLYCOL | FORTEQUIM | ANTIFREEZE | Density at 25° C.: 1.110 (+/− 0.005) Kg/L, purity by chromatography of gas: 99% (min), Distillation range: 186-198° C., solubility: complete Humidity by Karl Fisher: 0 50% (max.) |
| TEXANOL | FORTEQUIM | PLASTIFIER | Density at 25° C.: 0.945 (+/−0.010) Kg/L, by chromatography of gas: 99% (min), distillation range: 235-255° C., |
| NAFTA GAS | FORTEQUIM | THINNER | Density at 25° C.: 0.775-0.785 Kg/L, by chromatography of gas: 98% (min), distillation range: 155-200° C., Solubility: insoluble |
| ACRYLIC THICKENER | WYN OF MÉXICO | THICKENER | Solids: 29.0-31.0%, pH at 25° C.: 2.5-3.5, Viscosity brookfield: 100 cps (max.). presentación |
| CELLOSIZE QPS 52000 | MEXICAN CORPORATION OF POLYMERS | CELLULOSE | Viscosity brookfield: 2,400-3,000 cps. insoluble in water (aqueous solution at 1%): 0 0-1.0% in weight volatility (aqueous solution at 1%): 0.0-5.0% in weight, hydration time (aqueous solution at 1%): 5.0-15.0% in weight |
| TITANIUM DIOXIDE R-902 | DUPONT | PIGMENT | Color? L: 99.20 (min.), Colour A: −0.9 a −0.3, Tonality relative B: 1.60-2.80, Black smoke undertone: 100-140, Fineness Hegman: 7.00 |

TABLE 3-continued

Component list according trade name, related to the thermal insulation
and waterproof composition obtained by the used process in the present invention.

| TRADE NAME | MANUFACTURER | USE | SPECIFICATIONS |
|---|---|---|---|
| STYRENE ACRYLIC RESIN | WYN OF MÉXICO | ADHERENT BINDER | (min.), Final count of particles: 4 00 (min.), Particles countings Scats: 150 (max.) brightness (20 grades): 60 (min.), Oil Absorption: 13.0-20.0, pH: 7.3-9.5, Resistance 30° C.: 4.0 (min.) physical aspect: white powder, thin Solids: 49.0-51.0%, Viscosity: 10,000-20,000 cps, pH at 25° C.: 4.0-5.0 |

It should be emphasized that based on diverse trial and error tests, making variations in aggregate and sequencing of components, as well as prime material changes, is obtained a monolithic, padded and flexible film, as a result of the granulometric modifications of the particles which gives to the product thermal insulation and waterproof functions.

Unlike the acrylic waterproof coatings, the thermal insulation cell acrylic waterproof material of the present invention, allows the obtaining of films with thickness from 1.2 to 1.5 mm. in one step, however, during the coating process, the times are often extended by drying each applied film. Starting from this feature and to facilitate the installation of the coating, we intend to manufacture films of various thickness to find the ideal to form a flexible, manageable and adherible film, but at the same time complying with minimum insulation and waterproofing properties, with possible minimum material and without excess of the same. We worked with different thicknesses, such as 1.2, 1.5, 2.4, 2.6, 2.8, 3.0, 3.2, 3.4, 3.6, 3.8, 4.0, 4.2 and 4.4 mm, and according to tests carried out, the preferred modality that complies with the requirements is 2.8 to 3.0 mm, for general applications and uses.

The film of the present invention is made preferably by applying insulation and waterproofing material over a layer of thermoplastic polymer, preferably polyethylene, to achieve a uniform layer with the same thickness throughout its surface. The application can be manual with brushes, rollers or spray until desired thickness is achieved. The drying of the layer of insulation and waterproofing material must be carried out at temperatures between 45 to 70° C., preferably at 50° C., which will depend on the thickness of the layer, where the means of drying preferentially selected are weather, hot air flow and heating furnaces. Once dried, the insulation and waterproofing material presents a loss of volume between 9.5 and 10%, preferably of 9.7% compared to the initial volume of the mixture of insulation and waterproofing material.

To adhere the film to a surface, a layer of adhesive is applied on at least one side of the base layer, preferably water-based acrylic adhesive, where said adhesive layer is applied while installing the film, or it can be integrated with the base layer. To corroborate the suitable adhesive, different adhesives were tested, with the best adhesion and compatibility of those adhesives formulated with high adhesiveness acrylic resins, solvent-free water-based, thick with viscosity of 1,000 to 2,000 cps, a pH between 8.5 and 9.5, and a density of 1 to 1.01 Kg/L. Other types of adhesives that can be used are those formulated with solvent-based phenolic resins.

The size of the film may vary depending on the place where it applies, where a handling modality is in rolls with a width of 1 cm, 10 cm, 50 cm, and 1 m by 7 m long. Film is preferably used for its marketing of 1.22 m wide by 7.31 m long, with a thickness of 2.8 to 3.0 mm, a weight of 14.5 to 14.8 Kg, a K factor of 0.0640 W/m° K and an emissivity of 0.8 (at 23° C.).

The advantages of the thermal insulation waterproofing and adherible film of the present invention were tested through field evaluations and various laboratory tests.

Various scientific tests were carried out, such as the measurement of thermo mechanical properties and thermal conductivity to determine the R factor (thermal resistance) and K factor (thermal conductivity factor), which were performed in the Research Center for Applied Chemistry (CIQA) of CONACYT, and for EMA laboratory of the IDESA company, where evaluated experimental parameters were as follows:

| THERMOMECHANICAL PROPERTIES | |
|---|---|
| 1. Maximum stress: | 56.58 psi ± 6.80 |
| 2. Rupture stress: | 41.60 psi ± 11.73 |
| 3. Young's modulus: | 388.5 psi ± 46.1 |
| 4. Elongation: | 69% ± 26.54 |

| DETERMINATION | RESULT | UNITS |
|---|---|---|
| Thermal Transmission ($\lambda$) | 0.0391 | W/m · K |
| Thermal Resistance (R) | 0.116 | K · m$^2$/W |
| Thermal Conductance | 8.59 | W/m$^2$ · K |
| Thermal Resistivity | 25.58 | K · m/W |
| Specimen Thickness | 0.00455 | m |
| Conditioning (time/temperature) | 20:30 h a 95° C. | h/° C. |
| Mass loss during conditioning | 9.7 | % |
| Conditioned specimen density | 515.16 | kg/m$^3$ |
| Mass gained during the test | −0.02 | % |
| Average test temperature | 24.4 | ° C. |
| Temperature gradient | 4225.4 | K/m |
| Heat Flow | 165.17 | W/m$^2$ |
| Test duration | 3 643 | s |
| Orientation and position of the measurement | Horizontal with identification to the front | |

Additionally, the film of the present invention was successfully certified in the evaluation standard NOM-018-ENER-1997 and 2011 for thermal insulation and waterproofing coating, as well as those evaluations about characteristics, limits and test methods such as NMX-C126-1982 NMX-C181-1984-1984-C210 NMX, NMX-1984 and ASTM C288-C272.

Even when the present invention has been described respective of some preferred embodiments, it is obvious that alterations and equivalent modifications can be proposed by a skilled person in the field, after reading and understanding the description, therefore it is understood that this invention is not limited to that which was illustrated, but the scope of the claims.

What is claimed is:

1. A thermal insulation waterproofing and adherible film to coat a surface including pipes, ducts, containers, or ovens, comprising:

a base layer having a thicknesses selected from the group consisting of 1.2, 1.5, 2.4, 2.6, 2.8, 3.0, 3.2, 3.4, 3.6, 3.8, 4.0, 4.2, and 4.4 mm, the base layer is made from a composition of insulation and waterproof material including:

| a) | water | 48 to 52%; |
|---|---|---|
| b) | sodium hexametaphosphate | 0.05 to 0.12%; |
| c) | isothiazolone | 0.018 to 0.027%; |
| d) | polyelectrolyte of carboxylate salt | 0.15 to 0.22%; |
| e) | thickener | 1.6 to 2.4%; |
| f) | monoethylene glycol | 0.04 to 0.12%; |
| g) | titanium dioxide | 1.05 to 1.85%; |
| h) | calcium carbonate | 15.5 to 19.5%; |
| i) | styrene acrylic resin | 15.5 to 19.5%; |
| j) | dioctyl phthalate | 1.05 to 1.85%; |
| k) | plasticizer | 0.07 to 0.15%; |
| l) | ammonium hydroxide | 1.05 to 1.85%; |
| m) | acrylic thickener | 0.9163% |
| n) | 2-ethyl-hexane | 2.83 to 7.83%; |
| o) | hydroxy methyl cellulose | 0.01 to 0.8%; and |
| p) | thinner | 0.45 to 1.25%. |

2. The film according to claim 1, wherein the composition has a dense non-fluid consistency, wherein the composition has a thermal conductivity factor (K) of 0.39 W/(m° K), an emissivity from 0.8 to 23° C., a pH between 7.0 and 9.0, a viscosity from 40,000 to 85,000 cps, an apparent density of 515.16 Kg/m³, a steam water permeability of 0.00921 ng/(Pa*s*m), a humidity adsorption of % mass of 0.065, and a % volume of 0.031.

3. A thermal insulation waterproofing and adherible film to coat a surface including pipes, ducts, containers or ovens, comprising:

a base layer having a thicknesses selected from the group consisting of 1.2, 1.5, 2.4, 2.6, 2.8, 3.0, 3.2, 3.4, 3.6, 3.8, 4.0, 4.2, and 4.4 mm, the base layer is made from a composition of insulation and waterproof material including:

| a) | water | 48 to 52%; |
|---|---|---|
| b) | sodium hexametaphosphate | 0.05 to 0.12%; |
| c) | isothiazolone | 0.018 to 0.027%; |
| d) | polyelectrolyte of carboxylate salt | 0.15 to 0.22%; |
| e) | thickener | 1.6 to 2.4%; |
| f) | monoethylene glycol | 0.04 to 0.12%; |
| g) | titanium dioxide | 1.05 to 1.85%; |
| h) | calcium carbonate | 15.5 to 19.5%; |
| i) | styrene acrylic resin | 15.5 to 19.5%; |
| j) | dioctyl phthalate | 1.05 to 1.85%; |
| k) | plasticizer | 0.07 to 0.15%; |
| l) | ammonium hydroxide | 1.05 to 1.85%; |
| m) | acrylic thickener | 0.9163%; |
| n) | 2-ethyl-hexane | 2.83 to 7.83%; |
| o) | hydroxy methyl cellulose | 0.01 to 0.8%; and |
| p) | thinner | 0.45 to 1.25% | wherein the film is attached to the surfaces by using an adhesive selected from the group consisting of water-based acrylic resins and solvent-based phenolic resins.

4. The film according to claim 1, wherein the film has thermomechanical values of:

Maximum stress: 56.58 psi±6.80;
Rupture stress: 41.60 psi±11.73;
Young's modulus: 388.5 psi±46.1; and
Elongation: 69%±26.54.

5. The film according to claim 1, wherein the film has a width selected from 1 cm, 10 cm, or 50 cm, and a length of 1 m to 7 m, a thickness of 2.8 to 3.0 mm, a K factor of 0.0640 W/(m° K), and an emissivity of 0.8 (at 23° C.).

6. The film according to claim 1, wherein the composition has a volume loss between 9.5 and 10% compared to an initial volume of the base layer.

7. A method for the preparation of the film of claim 1, the method comprising the next steps:

a) applying the base layer to a thermoplastic polymer layer, until reaching a selected thicknesses of 1.2, 1.5, 2.4, 2.6, 2.8, 3.0, 3.2, 3.4, 3.6, 3.8, 4.0, 4.2 or 4.4 mm; and where the application is performed by using brushes, rollers, or spray;

b) drying the base layer at temperatures between 45 to 70° C.; and, c) applying an adhesive layer to at least one side of the base layer, where the adhesive is selected from a water-based acrylic resin or a solvent-based phenolic resin.

* * * * *